(12) United States Patent
Dickfeld

(10) Patent No.: US 11,230,437 B2
(45) Date of Patent: Jan. 25, 2022

(54) FEEDING DEVICE FOR FEEDING PRODUCTS ONTO A CONVEYOR BELT

(71) Applicant: Nils Dickfeld, Alsbach-Hähnlein (DE)

(72) Inventor: Nils Dickfeld, Alsbach-Hähnlein (DE)

(*) Notice: Subject to any disclaimer, the term of this patent is extended or adjusted under 35 U.S.C. 154(b) by 0 days.

(21) Appl. No.: 16/648,255

(22) PCT Filed: Sep. 5, 2018

(86) PCT No.: PCT/EP2018/073803
§ 371 (c)(1),
(2) Date: Mar. 18, 2020

(87) PCT Pub. No.: WO2019/052861
PCT Pub. Date: Mar. 21, 2019

(65) Prior Publication Data
US 2020/0239237 A1    Jul. 30, 2020

(30) Foreign Application Priority Data
Sep. 18, 2017 (DE) .................... 10 2017 121 560.3

(51) Int. Cl.
*B65G 47/28* (2006.01)
*B65G 19/02* (2006.01)
(Continued)

(52) U.S. Cl.
CPC .......... *B65G 19/02* (2013.01); *B65G 15/58* (2013.01); *B65G 19/185* (2013.01);
(Continued)

(58) Field of Classification Search
CPC  B65G 35/08; B65G 47/1407; B65G 47/1478; B65G 47/28
(Continued)

(56) References Cited

U.S. PATENT DOCUMENTS 1,565,849 A * 12/1925 Durand, Jr. ............. C03B 35/26
65/276
3,924,732 A * 12/1975 Leonard ............. B65G 47/1471
198/404

(Continued)

FOREIGN PATENT DOCUMENTS

JP     S6023127 U    2/1985
JP     H01109014 U   7/1989

(Continued)

OTHER PUBLICATIONS

International Search Report (dated Jan. 15, 2019) for corresponding International App PCT/EP2018/073803.

*Primary Examiner* — Joseph A Dillon, Jr.
(74) *Attorney, Agent, or Firm* — WRB-IP LLP

(57) ABSTRACT

A feeding device for feeding products from a storage container on to a conveyor belt moving in a conveyor direction is provided wherein a feeding belt at a storage container opening on a lower side of the storage container receives products to be conveyed and transports them to an upper side of the conveyor belt, in order to deliver the products on to the conveyor belt in a feeding region on the upper side of the conveyor belt, the feeding belt has a number of holes, the dimensions of which are adapted to the products to be conveyed such that a respective product can fall through an associated hole. A guiding element extending from the storage container opening to the feeding region on the upper side of the conveyor belt, including a guiding surface arranged directly below the feeding belt, is arranged on a lower side of the feeding belt in such a way that the guiding surface prevents the products from falling through the holes of the feeding belt until the products are delivered on to the upper side of the conveyor belt in the feeding region. The holes are arranged in the feeding belt in a matrix shape. The (Continued)

guiding surface of the guiding element forms a low-friction and abrasion-resistant flat sliding surface.

11 Claims, 3 Drawing Sheets

(51) Int. Cl.
  *B65G 15/58* (2006.01)
  *B65G 19/18* (2006.01)
  *B65G 37/00* (2006.01)
  *B65G 47/14* (2006.01)

(52) U.S. Cl.
  CPC ....... *B65G 37/005* (2013.01); *B65G 47/1407* (2013.01); *B65G 47/1478* (2013.01); *B65G 2201/0214* (2013.01); *B65G 2201/047* (2013.01); *B65G 2812/02168* (2013.01)

(58) Field of Classification Search
  USPC .... 198/397.06, 445, 446, 543; 221/161, 253
  See application file for complete search history.

(56) References Cited

U.S. PATENT DOCUMENTS

| | | | | |
|---|---|---|---|---|
| 3,925,960 A * | 12/1975 | Saari | ............ | B65B 39/145 53/167 |
| 4,094,129 A | 6/1978 | List | | |
| 4,248,027 A | 2/1981 | Cleary et al. | | |
| 4,747,479 A * | 5/1988 | Herrman | ............ | G01R 31/013 198/345.2 |
| 5,163,265 A * | 11/1992 | Darcy | ............ | B65B 25/00 53/118 |
| 5,350,467 A * | 9/1994 | Evans | ............ | B65G 47/1407 148/252 |
| 5,522,512 A * | 6/1996 | Archer | ............ | B65B 57/14 209/580 |
| 5,829,632 A * | 11/1998 | Gehlert | ............ | B65G 47/1407 221/268 |
| 5,984,079 A * | 11/1999 | Garcia | ............ | G01R 31/013 198/392 |
| 6,378,691 B2 * | 4/2002 | Phelps | ............ | B65G 47/1471 198/456 |
| 6,435,338 B1 * | 8/2002 | Iwamoto | ............ | B65G 47/1485 198/396 |
| 6,505,460 B2 * | 1/2003 | Aylward | ............ | B65B 5/103 53/473 |
| 6,568,151 B2 * | 5/2003 | Buckley | ............ | B65G 15/42 198/803.14 |
| 6,832,681 B2 * | 12/2004 | VanBerlo | ............ | B65G 47/19 198/455 |
| 7,222,717 B2 * | 5/2007 | Monti | ............ | B65G 47/145 198/445 |
| 7,455,209 B2 * | 11/2008 | Bourrieres | ............ | B23K 3/0607 228/246 |
| 7,841,819 B1 * | 11/2010 | Berres | ............ | A47G 19/10 414/9 |
| 7,850,403 B2 * | 12/2010 | Lorange | ............ | B65G 51/03 406/79 |
| 8,220,616 B2 * | 7/2012 | Manders | ............ | B65G 47/1471 198/459.5 |
| 2003/0042112 A1 * | 3/2003 | Woerner | ............ | B65G 47/1471 198/446 |
| 2004/0035908 A1 * | 2/2004 | Bourrieres | ............ | H05K 3/3478 228/49.6 |
| 2006/0157497 A1 * | 7/2006 | Corral | ............ | B65G 47/1478 221/156 |
| 2006/0185754 A1 * | 8/2006 | Baroncini | ............ | B65B 5/103 141/67 |
| 2008/0121573 A1 * | 5/2008 | Loecht | ............ | B65B 35/14 209/684 |
| 2011/0146213 A1 * | 6/2011 | Terzini | ............ | B65B 57/20 53/473 |
| 2015/0203226 A1 | 7/2015 | Baroncini | | |
| 2016/0159554 A1 * | 6/2016 | Daniels | ............ | G07F 11/005 221/1 |
| 2016/0229575 A1 * | 8/2016 | Lapointe | ............ | B65B 57/20 |
| 2018/0029805 A1 * | 2/2018 | Ragan | ............ | B65G 39/10 |
| 2019/0265263 A1 * | 8/2019 | Masutani | ............ | G01N 35/04 |
| 2020/0130947 A1 * | 4/2020 | Dickfeld | ............ | B65G 43/10 |

FOREIGN PATENT DOCUMENTS

| | | |
|---|---|---|
| JP | H0252822 U | 4/1990 |
| JP | H0426916 U | 3/1992 |
| JP | H0461678 U | 5/1992 |
| JP | H06177587 U | 6/1994 |

* cited by examiner

FEEDING DEVICE FOR FEEDING PRODUCTS ONTO A CONVEYOR BELT

BACKGROUND AND SUMMARY

The invention relates to a feeding device for feeding products out of a storage container on to a conveyor belt moving in a conveyor direction, wherein a feeding belt receives products to be conveyed at a storage container opening on a lower side of the storage container and transports them to an upper side of the conveyor belt in order to deliver the products on to the conveyor belt in a feeding region on the upper side of the conveyor belt.

Many different conveyor belts are known in practice, with which products that are located thereon can be conveyed in a conveyor direction defined by the path of the conveyor belt. The products to be conveyed in this case are generally placed on an upper side of the conveyor belt and conveyed by the conveyor belt over a defined conveying distance until the products are removed from the conveyor belt at the end of the conveying distance or supplied to a further processing step or a forwarding of the products. As the conveyor belt, for example a flexible endless belt can be used, which is continuously circulated by an arrangement of rolls or rollers. Instead of a flexible conveyor belt, a conveyor chain made up of multiple belt elements can also be employed. Roller or roll tracks are also known, in which a number of cylindrical rollers arranged one after another and mounted so as to be rotatable about a rotational axis transverse to the conveyor direction form a conveyor track along which the products can roll.

In the case of larger products, such as e.g. packages or suitcases, it is often unnecessary to feed them on to the conveyor belt in a position-controlled manner since the individual packages, or cases do not generally have to be arranged, next to each other on the conveyor belt and a distance between two consecutive packages or suitcases can also vary. In the case of other, generally small, products on the other hand, it is often desirable to feed the individual products on to the conveyor belt in, as far as possible, a precisely defined arrangement. Thus, for example, it is advantageous for an automatic quality control or for a subsequent further processing of the products at a production facility where further processing is carried out if the individual products are arranged and conveyed on the conveyor belt with a definable distance between them.

The feeding devices known in practice often do not permit a controlled feeding or arrangement of individual products on the conveyor belt. Particularly for products that are capable of rolling, such as e.g. tablets, capsules or also screws or ampoules, a controlled feeding of the individual products on to the conveyor belt can generally only be accomplished by laboriously segregating the products in advance and supplying the products separately using separate supply devices, which are often also spatially set apart from each other.

In the case of a storage container that is arranged directly above the conveyor belt, the space available for the segregation and separate supply is often inadequate. For this purpose, a feeding belt can be arranged between a storage container in which the products to be conveyed are initially collected and stored and the conveyor belt, with the aid of which feeding belt a controlled feeding of the individual products on to the conveyor belt is facilitated. During the transport of the products from the storage container to the conveyor belt, a segregation and a specifically defined arrangement of the products can take place along the transport distance defined by the feeding belt.

The conveyor belt can also be part of a larger processing facility for the products. If the storage container is not to be arranged directly above the conveyor belt, as is often desired in practice, the products intended for the conveyor belt can be transported by the feeding belt to the conveyor belt from a storage container arranged at the side of and adjacent to the conveyor belt and fed on to the conveyor belt at the end of the feeding belt.

It is desirable to configure a feeding device for feeding products on to a conveyor belt such that the largest possible number of products can be reliably arranged in defined positions on the conveyor belt in each case with the lowest possible effort.

According to an aspect of the invention the feeding belt has a number of holes, the dimensions of which are adapted to those of the products to be conveyed such that a product can fall through an associated hole in each case, and in that on a lower side of the feeding belt a guiding element is arranged extending from the storage container opening to the feeding region on the upper side of the conveyor belt, with a guiding surface arranged directly below the feeding belt such that the guiding surface prevents the products from falling through the holes of the feeding belt until the products are delivered on to the upper side of the conveyor belt in the feeding region. The holes located in the feeding belt each serve to receive one product. The arrangement of the products in the feeding belt can be defined by the arrangement of the holes in the feeding belt. It just has to be ensured that a product can only exit from the storage container opening on the lower side of the storage container when it can be received in a hole in the feeding belt that is still vacant. This can be guaranteed by simple means, e.g. by scrapers, flexible lips or rotating brushes, which are arranged in the region of the storage container opening directly above an upper side of the feeding belt facing the storage container opening and which hold back all products that are not received in a hole in the feeding belt.

The guiding surface of the guiding element arranged directly below the feeding belt prevents a product received in a hole of the feeding belt from falling through the hole in question. By the transport movement of the feeding belt, the product located in the hole in question of the feeding belt is moved across the guiding surface of the guiding element and transported to the feeding region on the upper side of the conveyor belt. The guiding element ends there, and so the products transported across the end of the guiding element fall through the hole of the feeding belt that has now become free and fall or are fed on to the upper side of the conveyor belt at the position defined by the end of the guiding element.

The dimensions of the holes in the feeding belt in this case are adapted to the dimensions of the products to be transported such that in each hole only one product can be received in each case and the product received there can fall through the hole when a guiding surface of the guiding element is no longer arranged below the feeding belt. In the case of non-spherical products, which have a greater extension in one spatial direction than in another spatial direction, for example, an alignment of the individual products in the respectively allocated holes can already be defined by the shape of the holes in the feeding belt. The feeding belt can have a thickness that is adapted to the dimensions of the products to be transported, such that a product arranged in a hole in the feeding belt, which is in contact with the guiding surface located therebelow, does not project or projects only slightly beyond an upper side of the feeding belt with an upper side facing away therefrom. The feeding belt is expediently sufficiently thick for a hole wall delimiting a hole in the circumferential direction to provide a sufficiently large contact surface for the product received in the hole, so that a transport or displacement of the product on the guiding surface can be reliably accomplished.

The feeding belt can made from a flexible or elastic belt material, e.g. a suitable plastic material, and can be configured as an endless belt. It is likewise conceivable that the feeding belt is composed of a number of interconnected links, each of which is movably connected to adjacent links. The individual holes can have a constant cross-sectional area. If is likewise conceivable that a hole wall delimiting a hole has a frustoconical or bulbous shape.

According to an advantageous embodiment of the concept behind the invention, it is provided that multiple holes are arranged at a distance from one another in the receiving belt transverse to the direction of transport. In a row of holes, which is formed by the multiple holes arranged transverse to the direction of transport, a corresponding number of products can be transported at the same time and then fed on to the conveyor belt at the same time. In this way a comparatively large number of products can be fed on to the conveyor belt within a short time in a controlled manner and/or in a defined position and arrangement in each case.

With a view to the highest possible throughput of products, it is advantageous that the holes are arranged in a matrix shape in the feeding belt. The holes can be arranged in a number of rows of holes that are arranged transverse to the direction of transport and at a constant distance from each other in each case in the direction of transport.

With a view to the simplest and most cost-effective possible production of the feeding device, it is advantageous that the guiding element is a guide plate arranged below the feeding belt. A guiding element of this type can be produced simply and cost-effectively from a sheet metal blank. By suitable specification of the sheet metal material, a guiding surface that is suitable for transporting the products being moved thereon can be formed or provided. The guide plate can be adapted to the path of the feeding belt with no great effort, having e.g. an adapted curvature in the direction of transport or transverse thereto.

According to an advantageous embodiment of the concept behind the invention, it is provided that the guiding surface of the guiding element forms a low-friction and abrasion-resistant flat sliding surface. The guiding element can also be made of e.g. plastic or another material and can have a suitable coating or covering. Depending on the products to be transported, the coating or covering can consist of or comprise a material that is particularly suitable for the product in question. Thus, for products intended for human consumption, such as e.g. tablets or capsules, the guiding surface of the guiding element can consist of or comprise a material that is as far as possible abrasion-resistant and safe for human consumption. If hard or sharp-edged products, such as e.g. screws or small metallic pans, are moved over the guiding surface of the guiding element by the feeding belt, the material used for the guiding surface is expediently as hard and as low-friction as possible.

The guiding surface in this case can form a sliding surface that is as flat as possible without a three-dimensional profiling or texturing, the path of which is adapted to and follows the path of the feeding belt, so that the products located in the holes in the feeding belt are moved possibly exclusively in the direction of transport defined by the feeding belt and no irregularities in the guiding surface of the guiding element force a shift transverse to the direction of transport.

It is likewise conceivable and advantageous in terms of filling the individual holes in the feeding belt as reliably as possible that the guiding surface of the guiding element has a three-dimensional texturing, so that the products being transported over the guiding surface vibrate during transport. The guiding surface can exhibit the three-dimensional texturing in particular in the region of a possibly large-area storage container opening to assist in a reliable filling of the individual holes and, if desired, an alignment of the individual products in the respectively associated holes. The three-dimensional texturing should expediently be adapted e.g. to the size of the holes, to the generally small distance of the guiding surface from the feeding belt and to a transport rate of the feeding belt provided for the operation, so that individual products can be prevented from falling unintentionally through an associated hole and a product already located in a hole can be prevented from being unintentionally catapulted out again.

According to an optional embodiment of the concept behind the invention, it is provided that the feeding belt and the associated guiding surface at least initially exhibit an upward gradient in a receiving section starting from the storage container. By an upward gradient of the feeding belt in the region of the storage container opening, a reliable filling of the holes located in the feeding belt with products from the storage container can take place by simple means. Individual products that do not arrive in an associated hole in the receiving belt but are in contact with a surface of the receiving belt and may be transported along to some extent can be removed from the upper side of the feeding belt simply owing to the gradient of the feeding belt in order to slide or roll back down along the upper side of the feeding belt and return to the storage container opening.

To allow the products sliding out of the holes of the feeding belt to be fed as reliably as possible on to the conveyor belt at one end of the guiding element, it is provided according to an embodiment of the concept behind the invention that, in a delivery section leading to the feeding region on the upper side of the conveyor belt, the feeding belt and the associated guiding surface have a gradient adapted to a conveyor belt gradient of the conveyor belt, differing by less than 10 degrees from the conveyor belt gradient. In many cases, it should be advantageous if the gradient of the feeding belt in the delivery section is identical to the conveyor belt gradient. It can likewise be advantageous for the feeding belt to converge on to the conveyor belt at an acute angle and to approach the upper side of the conveyor belt until it is directly above it and to then be guided away from the conveyor belt and feed the products located in the holes in the feeding belt on to the conveyor belt in the region where it is closest to the conveyor belt.

To minimise an undesirable displacement of the products during the transfer of the products from the feeding belt on to the conveyor belt, it is optionally provided that a transport speed of the feeding belt and a conveying speed of the conveyor belt are synchronised. The transport speed of the feeding belt in this case corresponds as precisely as possible to the conveying speed of the conveyor belt, so that the products do not experience any acceleration in the conveyor direction of the conveyor belt during the transfer from the feeding belt to the conveyor belt, which could lead to an undesirable displacement of the products being fed. Using a suitable synchronising device it is possible to achieve the ability to vary the conveying speed of the conveyor belt over time, e.g. to adapt to changing processing operations or processing sequences within a larger processing facility, in which case the transport speed of the feeding belt is adapted to the respective conveying speed of the conveyor belt.

To assist with a defined arrangement of the products on the conveyor belt or, if appropriate, to provide additional definition after the products have been fed on to the conveyor belt, it is provided that the conveyor belt has positioning elements running transverse to the conveyor direction to define conveying positions of the products. The conveyor belt can have an undulating profiling, for example, for this purpose. It is likewise conceivable that the conveyor belt has indentations or protrusions arranged in rows or lines, by which a position of the products on the conveyor belt can be defined.

According to a particularly advantageous embodiment of the concept behind the invention, it is provided that the positioning elements are rolls, each of which is mounted so as to be rotatable around an axis of rotation running transverse to the conveyor direction and the distance between which, in the conveyor direction, is smaller than a smallest diameter of the products. The products are then arranged on the conveyor belt in individual rows, which are defined by the indentations formed between the individual rolls. The rolls, which are displaced in the conveyor direction e.g. by a continuous chain drive, can each be rotated around their axis of rotation and can transfer this rotating movement to the products arranged between two adjacent rolls, thus forcing a corresponding rotating movement of the products. On a conveyor belt of this type that is formed by rotatably mounted rolls displaced in the conveyor direction, the individual products can be observed from all sides owing to their rotating movement, while undergoing quality control. A simple and cost-effective automatic quality control is also possible.

BRIEF DESCRIPTION OF THE DRAWINGS

Exemplary embodiments of the concept behind the invention, each of which is illustrated schematically in the drawings, will be explained in more detail below. The figures show the following.

DETAILED DESCRIPTION

Figure 1:
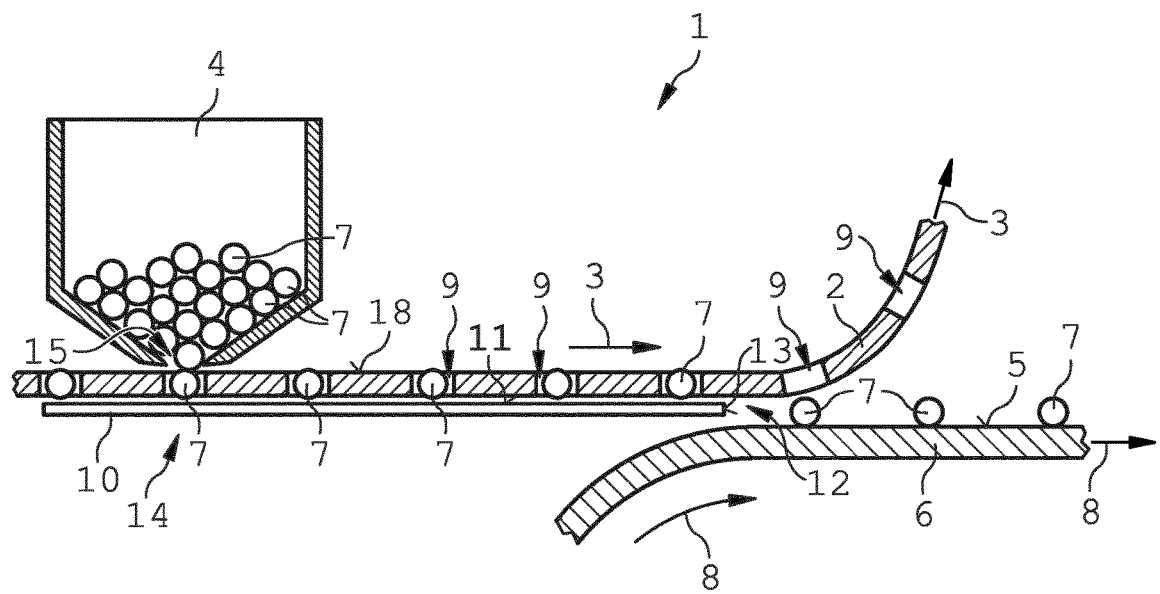
FIG. 1: a schematic sectional view of a feeding device according to the invention with a storage container, with a feeding belt arranged directly above a guiding element and with a conveyor belt.

A feeding device 1 illustrated in FIGS. 1 to 4 in different variants has a feeding belt 2, which is guided by a forced guidance (not illustrated in detail in the figures) in a direction of transport indicated by an arrow 3 from a storage container 4 to an upper side 5 of a conveyor belt 6. In the storage container 4 there area number of products 7 that are to be fed on to the conveyor belt 6 in a controlled manner, in order to then be conveyed by the conveyor belt 6 in a conveyor direction indicated by an arrow 8 from the storage container 4 to a destination not shown in the figures. The products 7 shown in the exemplary embodiments are pharmaceutical capsules, but almost any other products that can be delivered from a storage container 4 could also be fed from the storage container 4 on to the conveyor belt 6.

In the feeding belt 2, multiple holes 9 are formed at a distance from one another in the direction of transport 3. The dimensions of each hole 9 are adapted to the dimensions of the products 7 so that only a single product 7 can be received by each hole 9.

Directly below the feeding belt 2, a guiding element 10 with a guiding surface 11 of flat configuration facing the feeding belt 2 is arranged such that a product 7 received in a hole 9 in the feeding belt 2 is in contact with the guiding surface 11 of the guiding element 10 and is transported by the feeding belt 2 across the guiding surface 11 in the direction of transport 3. As a result of each of the products 7 being received in a respectively associated hole 9 in the feeding belt 2, a segregation of the individual products 7 and a positioning of the individual products 7 in the feeding belt 2 defined by the arrangement of the holes 9 in the feeding belt 2 takes place without major outlay in terms of construction. The products 7 are transported by the feeding belt 2 across the guiding surface 11 of the guiding element 10 to the conveyor belt 6.

In a feeding region 12 on the upper side 5 of the conveyor belt 6, the guiding element 10 terminates, the guiding surface 11 being delimited and terminated by a marginal edge 13. As soon as a hole 9 in the feeding belt 2 filled with a product 7 is transported beyond the marginal edge 13 and thus beyond the end of the guiding surface 11 of the guiding element 10, the product 7 located in the hole 9 is not held back in the hole 9 by the guiding element 10 and can fall down on to the upper side 5 of the conveyor belt 6. As a result, the position and arrangement of the product 7 on the upper side 5 of the conveyor belt 6 is defined. Expediently, a distance between the feeding belt 2 and the upper side 5 of the conveyor belt 6 is as small as possible.

In addition, a transport speed of the feeding belt 2 can be synchronised with a conveying speed of the conveyor belt 6, so that the feeding belt 2 and the conveyor belt 6 are moved at the same speed in the feeding region 12, and the product 7 does not experience any acceleration directed in the conveyor direction 8 during the transfer from the feeding belt 2 to the conveyor belt 6.

Figure 2:
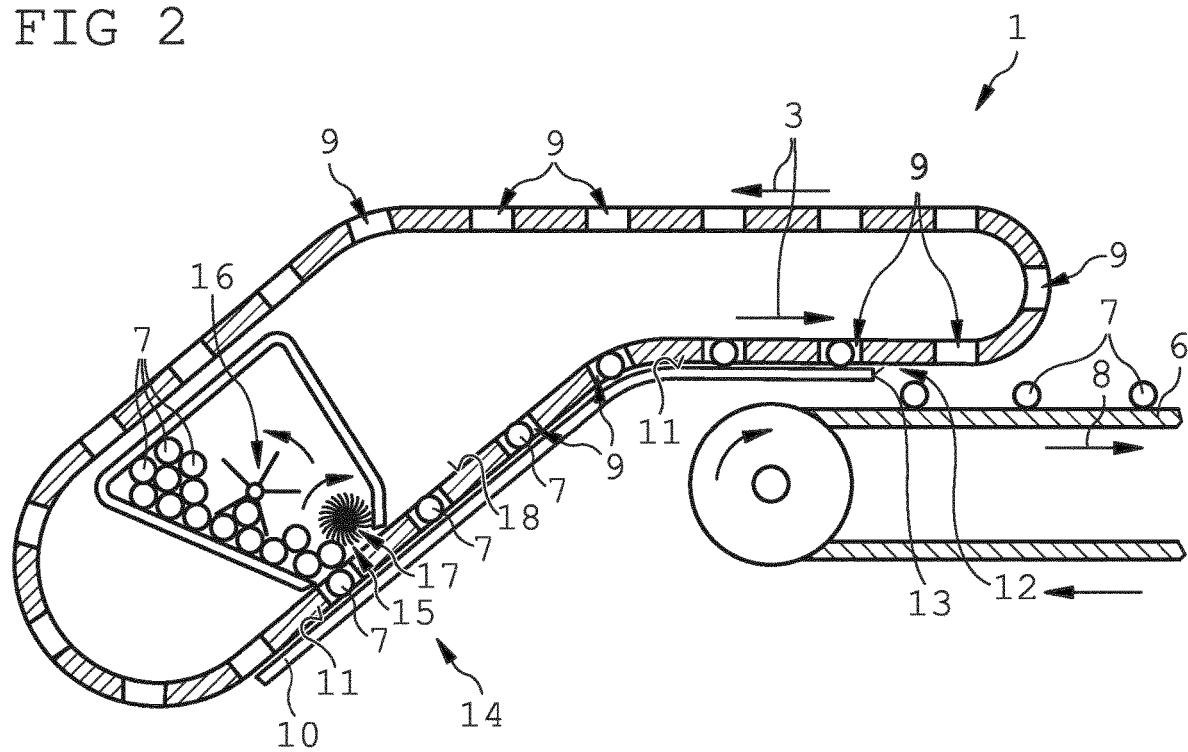
FIG. 2: a different embodiment of the feeding device according to the invention, wherein the feeding belt has an upward gradient in a receiving section starting from the storage container.

In the exemplary embodiment illustrated in FIG. 2, the feeding belt 2 exhibits an upward gradient in a receiving section 14, in which the storage container 4 is also arranged. Through a storage container opening 15 facing the feeding belt 2 as in the exemplary embodiment illustrated in FIG. 1, the individual products 7 located in the storage container 4 pass on to the feeding belt 2 and can be received by a hole 9 in the feeding belt 2 being transported past the storage container opening 15. In the storage container 4, additional product conveying devices 16 can be arranged, which guide individual products 7 to the storage container opening 15. A stripping brush 17 can be used to prevent products 7 that are lying on an upper side 18 of the feeding belt 2 and are not received in a hole 9 from being removed from the upper side 18 and moved back towards the storage container opening 15. In a further path of the feeding belt 2 in the form of an endless belt in a delivery section 19 leading to the feeding region 12 [has] a gradient adapted to a conveyor belt gradient of the conveyor belt 6, which does not differ from the conveyor belt gradient in the exemplary embodiment shown by way of example in FIG. 2.

Figure 3:
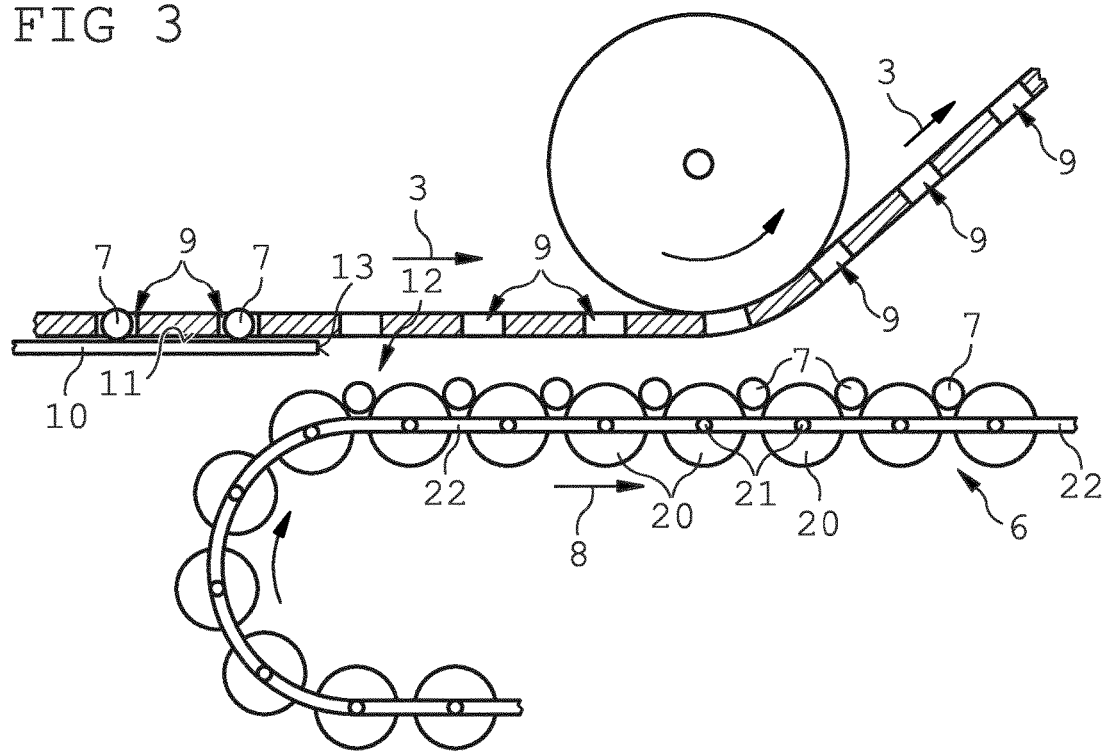
FIG. 3: an enlarged partial view of a transfer region from the feeding belt to a conveyor belt formed from rotatably mounted rolls.

In the exemplary embodiment illustrated in FIG. 3, wherein only a region around the feeding region 12 is illustrated in enlarged form, the conveyor belt 6 is formed by a number of rolls 20, which are in each case mounted so as to be rotatable around an axis of rotation 21 oriented transverse to the conveyor direction 8 and fixed on a conveyor chain 22 at a distance from one another in the conveyor direction 8. A free distance between rolls 20 arranged adjacently on the conveyor chain 22 is smaller than a smallest diameter of the products 7 to be conveyed on this conveyor belt 6, so that the individual products 7 are each arranged between two adjacent rolls 20 and are located there while being conveyed b the conveyor belt. In the case of products 7 that are capable of rolling, e.g. tablets or capsules, a rotating movement of the rolls 20 can be transferred to the products 7 that are capable of rolling and these can be driven into a rotating movement. The products 7 rotating on the conveyor belt can then be optically detected by simple means from many or all sides and e.g. counted or subjected to quality control.

Figure 4:
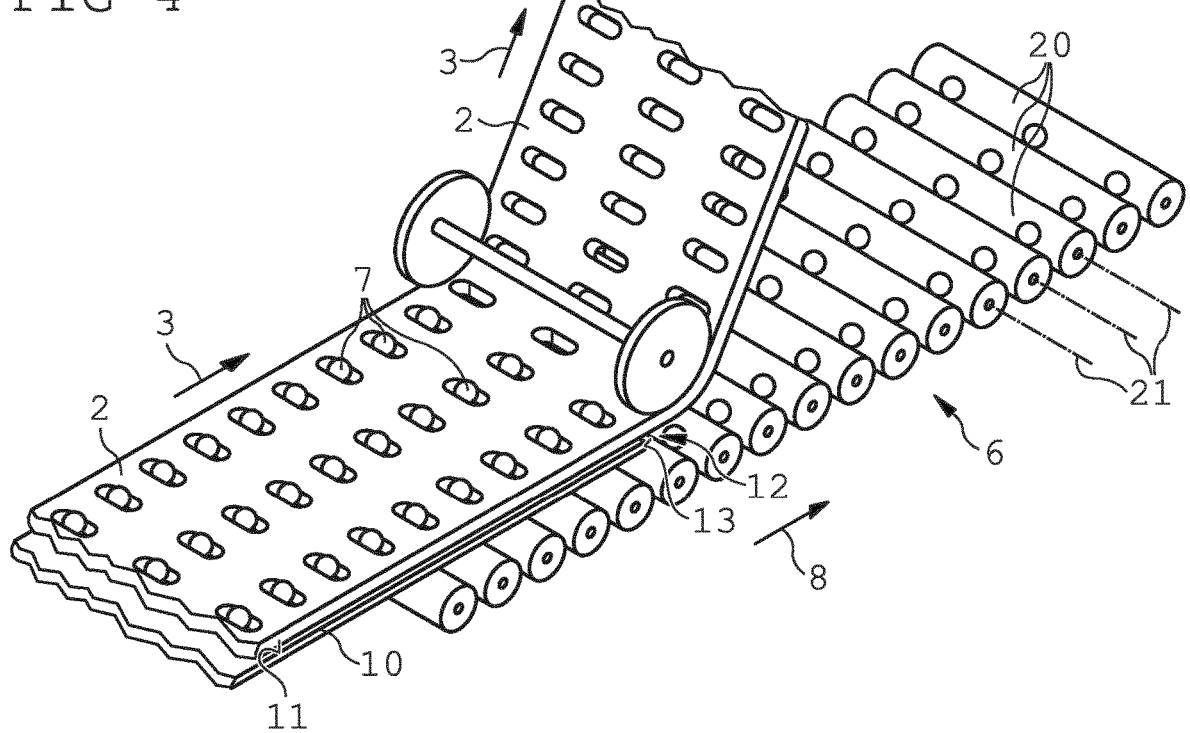
FIG. 4: a perspective view of a transfer region of a similarly configured feeding device as shown in FIG. 3, and FIG. 5: a schematic sectional view of another differently configured feeding device according to the invention in a region around the storage container.

In FIG. 4 an exemplary embodiment of comparable construction to the exemplary embodiment illustrated in FIG. 3 is shown in a perspective view in the region around the feed region.

Figure 5:
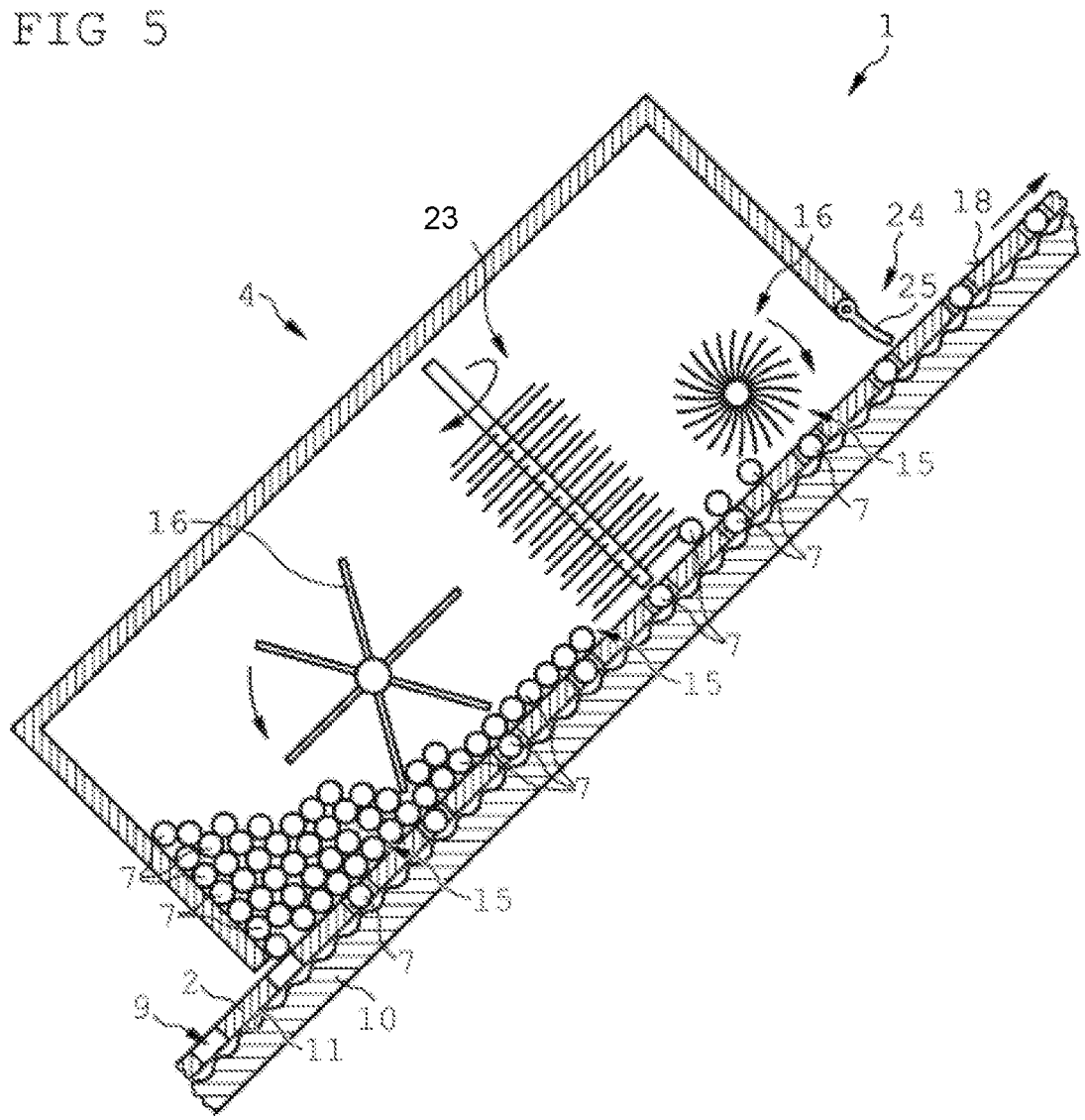

In the embodiment variant of the feeding device 1 according to the invention illustrated by way of example in FIG. 5, the substantially cuboid-shaped storage container 4, the width of which is adapted to a width of the feeding belt 1, has a storage container opening 15 extending over its entire lower side. The products 7 located in the storage container 4 can come into contact with the feeding belt 2 being transported past and directly below the storage container opening 15 over an entire length of the storage container 4 and can fall into one of the holes 9 arranged therein. In the storage container 15, one or more product conveying devices 16 can be arranged, which are in the form of e.g. brush or lip rollers and which rotate around a horizontal axis of rotation during operation. In order also to assist with a uniform distribution of the individual products 7 across the entire width of the feeding belt 2, furthermore, brush or lip rollers 23 rotating around a vertical axis of rotation can be arranged in the storage container 4. The terms horizontal and vertical here relate in each case to the orientation of the surface 18 of the feeding belt 2, since the direction of transport 3 the feeding belt 2 can exhibit a gradient and the feeding belt 2 can be correspondingly inclined. The rotating brush or lip rollers 16, 23 can also have an orientation inclined at almost any angle to the surface 18 of the feeding belt 2.

In addition to a stripping brush 17, for example elastic lip scrapers 25 can be arranged in the region of a marginal edge 24 of the storage container opening 15, on the one hand to prevent an undesirable exit of individual products 7 from the storage container 4 outside of the holes 9 in the feeding belt 2 and at the same time, by means of the elastic lip of the lip scraper 25, to avoid an undesirable blockage of the feeding device 1 or damage to individual products 7 that are transported by the feeding belt 2 to the marginal edge 24 and could otherwise exit from the storage container opening 15 there.

The guiding surface 11 of the guiding element 10 has a three-dimensional texturing. The three-dimensional texturing can be e.g. an undulating surface finish or can have a number of evenly or unevenly distributed protrusions projecting towards the feeding belt 2. As a result of the three-dimensional texturing of the guiding surface 11 of the guiding element 10, the products 7 located in the holes 9 are caused to vibrate during transport along the guiding surface 11 and these vibrations are transferred to products 7 in the storage container 4 that may be adjacent to the vibrating products 7 in the holes 9, whereby a reliable filling of the individual holes 9 with one product 7 each across the storage container opening 15 can advantageously be assisted.

The invention claimed is:

1. A feeding device for feeding products from a storage container on to a conveyor belt moving in a conveyor direction, wherein a feeding belt receives products to be conveyed at a storage container opening on a lower side of the storage container and transports them to an upper side of the conveyor belt, in order to deliver the products on to the conveyor belt in a feeding region on the upper side of the conveyor belt, wherein the feeding belt comprises a number of holes, the dimensions of which are adapted to the products to be conveyed such that a respective product can fall through an associated hole, and in that a guiding element extending from the storage container opening to the feeding region on the upper side of the conveyor belt, comprising a guiding surface arranged directly below the feeding belt, is arranged on a lower side of the feeding belt in such a way that the guiding surface prevents the products from falling through the holes of the feeding belt until the products are delivered on to the upper side of the conveyor belt in the feeding region, wherein the conveyor belt comprises positioning elements running transverse to the conveyor direction to define conveying positions of the products, and wherein the positioning elements are rolls, each of which is mounted so as to be rotatable around an axis of rotation running transverse to the conveyor direction and the distance between which is smaller in the conveyor direction than a smallest diameter of the products.

2. The feeding device according to claim 1, wherein multiple holes are arranged in the feeding belt at a distance from one another transverse to the direction of transport.

3. The feeding device according to claim 1, wherein the holes are arranged in the feeding belt in a matrix shape.

4. The feeding device according to claim 1, wherein the guiding element is a guide plate arranged below the feeding belt.

5. The feeding device according to claim 1 wherein the guiding surface of the guiding element forms a low-friction and abrasion-resistant flat sliding surface.

6. A feeding device for feeding products from a storage container on to a conveyor belt moving in a conveyor direction, wherein a feeding belt receives products to be conveyed at a storage container opening on a lower side of the storage container and transports them to an upper side of the conveyor belt, in order to deliver the products on to the conveyor belt in a feeding region on the upper side of the conveyor belt, wherein the feeding belt comprises a number of holes, the dimensions of which are adapted to the products to be conveyed such that a respective product can fall through an associated hole, and in that a guiding element extending from the storage container opening to the feeding region on the upper side of the conveyor belt, comprising a guiding surface arranged directly below the feeding belt, is arranged on a lower side of the feeding belt in such a way that the guiding surface prevents the products from falling through the holes of the feeding belt until the products are delivered on to the upper side of the conveyor belt in the feeding region, wherein the guiding surface of the guiding element has a three-dimensional texturing, so that the products transported over the guiding surface vibrate during transport.

7. The feeding device according to claim 1, wherein the feeding belt and the associated guiding surface exhibit an upward gradient at least initially in a receiving section starting from the storage container.

8. The feeding device according to claim 1, wherein the feeding belt and the associated guiding surface, in a delivery section leading to the feeding region on the upper side of the conveyor belt, exhibit a gradient adapted to a conveyor belt gradient of the conveyor belt, which differs from the conveyor belt gradient by less than 10 degrees.

9. A feeding device for feeding products from a storage container on to a conveyor belt moving in a conveyor direction, wherein a feeding belt receives products to be conveyed at a storage container opening on a lower side of the storage container and transports them to an upper side of the conveyor belt, in order to deliver the products on to the conveyor belt in a feeding region on the upper side of the conveyor belt, wherein the feeding belt comprises a number of holes, the dimensions of which are adapted to the products to be conveyed such that a respective product can fall through an associated hole, and in that a guiding element extending from the storage container opening to the feeding region on the upper side of the conveyor belt, comprising a guiding surface arranged directly below the feeding belt, is arranged on a lower side of the feeding belt in such a way that the guiding surface prevents the products from falling through the holes of the feeding belt until the products are delivered on to the upper side of the conveyor belt in the feeding region, wherein a transport speed of the feeding belt and a conveying speed of the conveyor belt are synchronised.

10. The feeding device according to claim 9, wherein the conveyor belt comprises positioning elements running transverse to the conveyor direction to define conveying positions of the products.

11. The feeding device according to claim 10, wherein the positioning elements are rolls, each of which is mounted so as to be rotatable around an axis of rotation running transverse to the conveyor direction and the distance between which is smaller in the conveyor direction than a smallest diameter of the products.

* * * * *